United States Patent [19]
Nussbaum et al.

[11] Patent Number: 5,105,783
[45] Date of Patent: Apr. 21, 1992

[54] DIGITAL IGNITION SYSTEM

[75] Inventors: Stephen H. Nussbaum, Temecula; Jeffrey E. Folts, San Diego, both of Calif.

[73] Assignee: Allied-Signal Inc., Morristown, N.J.

[21] Appl. No.: 632,229

[22] Filed: Dec. 20, 1990

[51] Int. Cl.$^5$ .................. F02P 15/12; F02P 5/15; F02D 17/00
[52] U.S. Cl. .................. 123/335; 123/416; 123/625; 123/643; 364/431.04
[58] Field of Search .......... 123/335, 416, 417, 609, 123/424, 643, 625; 364/431.04; 324/384

[56] References Cited

U.S. PATENT DOCUMENTS

| | | |
|---|---|---|
| 4,099,507 | 7/1978 | Pagel et al. .................. 123/416 |
| 4,494,509 | 1/1985 | Long .................. 123/416 |
| 4,606,315 | 8/1986 | Tobinaga et al. .................. 123/417 |

Primary Examiner—Tony M. Argenbright
Attorney, Agent, or Firm—Leo H. McCormick, Jr.; Larry J. Palguta; Robert A. Walsh

[57] ABSTRACT

A method of and apparatus for enabling at least one spark plug of a internal combustion engine to provide a fuel igniting spark at a selectable time in the engine cycle is disclosed. Sensors provide a first engine rotation determined pulse train the repetition rate of which is the same as the number of revolutions per second of the engine and a second engine rotation determined pulse train the repetition rate of which is an integral multiple of that of the first pulse train. The reference pulse initiates a count of pulses in the second pulse train and, upon reaching a preselected count, initiates a count of pulses in a third independent pulse train having a much greater repetition rate. The spark plug is enabled when the third pulse train count reaches a preselected count. In the event the engine is a multi-cylinder engine having at least one spark plug for each cylinder, the pulses in the second pulse train are counted up to different preselected counts for different cylinders and a different spark plug is enabled for each different preselected count.

15 Claims, 7 Drawing Sheets

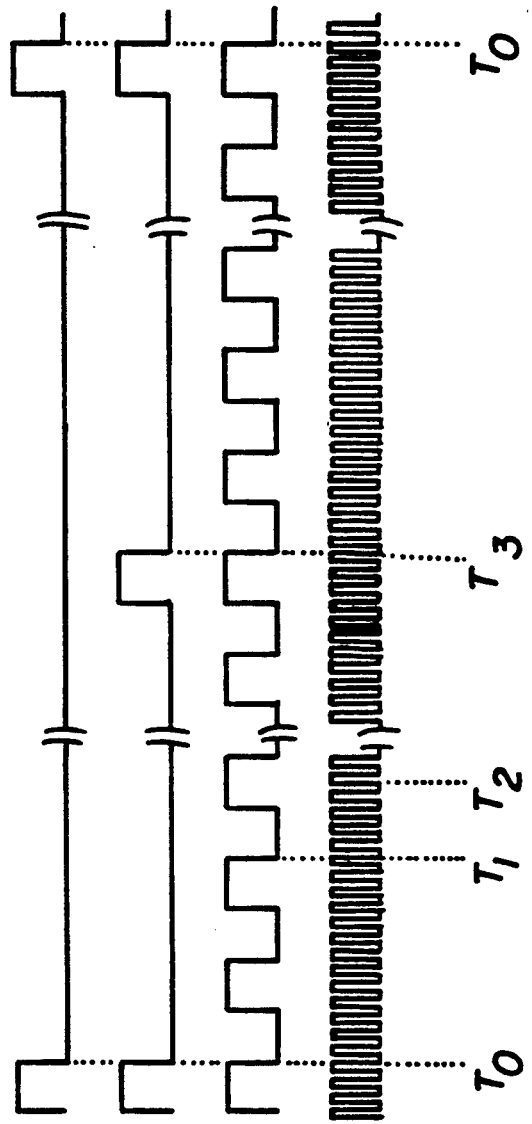

DIGITAL IGNITION SYSTEM

The present invention relates generally to apparatus methods and processes for controlling the ignition timing in a spark ignited internal combustion engine and more particularly to a microprocessor based ignition system for such engines, particularly large industrial engines.

Current ignition systems are cumbersome, somewhat inaccurate, and not readily adaptable to the use of different fuels in the same engine. Current ignition systems do not provide dependable overspeed protection.

Among the several objects of the present invention may be noted the provision of a readily programmed microprocessor based ignition control system; the provision of a microprocessor based ignition system having overspeed protection with programmable options for warning or shutdown; the provision of a microprocessor based ignition system which provides precise ignition pulse timing predicted on a two stage counting process where gross pulses are counted and thereafter much higher repetition rate clock pulses are counted during the final countdown to ignition; the provision of an ignition system where virtually all of the engine operating parameters are easily programmed into the system so that the same ignition unit may be adapted to engines having, for example, different numbers of cylinders, different ignition timing requirements for start-up as well as varying load conditions when running, varying fuels, and either two or four-stroke-cycle operation; the provision of either two or four-stroke-cycle operation without the need for a separate camshaft reference signal sensor; and the provision of an automatic microprocessor based ignition control system having optional manual control to fine-tune the ignition timing if necessary.

The present invention allows a more precise setting of the ignition timing which in turn allows for more optimum engine operation since, e.g., a greater spark advance may be provided when needed while minimizing detonation thereby reducing engine damage or maintenance requirements.

It is therefor a specific object of the present invention to more precisely control the point in the engine cycle at which ignition occurs than was heretofor possible. These as well as other objects and advantageous features of the present invention will be in part apparent and in part pointed out hereinafter.

In general, an internal combustion engine microprocessor based ignition system which allows a more precise setting of the ignition timing to more precisely control the point in the engine cycle at which ignition occurs has first and second crankshaft rotation sensors for providing a first pulse train the repetition rate of which is the same as the number of revolutions per second of the engine, and a second pulse train the repetition rate of which is an integral multiple of the first pulse train whereby a reference pulse is provided which is indicative of engine crankshaft position and a series of pulses is provided indicative of engine speed. An independent third pulse train the repetition rate of which is significantly higher than that of the second pulse train is generated, for example, by an internal clock, and digital circuitry responds to the reference pulse to initiate a count of pulses in the second pulse train and, upon reaching a preselected count, to initiate a count of pulses in the third pulse train. A desired value of the third pulse train count which is indicative of the desired time of ignition in the engine cycle is preprogrammed into the system and when the third pulse train count reaches the stored desired value, ignition occurs.

BRIEF DESCRIPTION OF THE DRAWING

FIGS. 3A, 3B, 3C and 3D illustrate the pulse trains utilized in accurately determining the time of ignition.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1A:
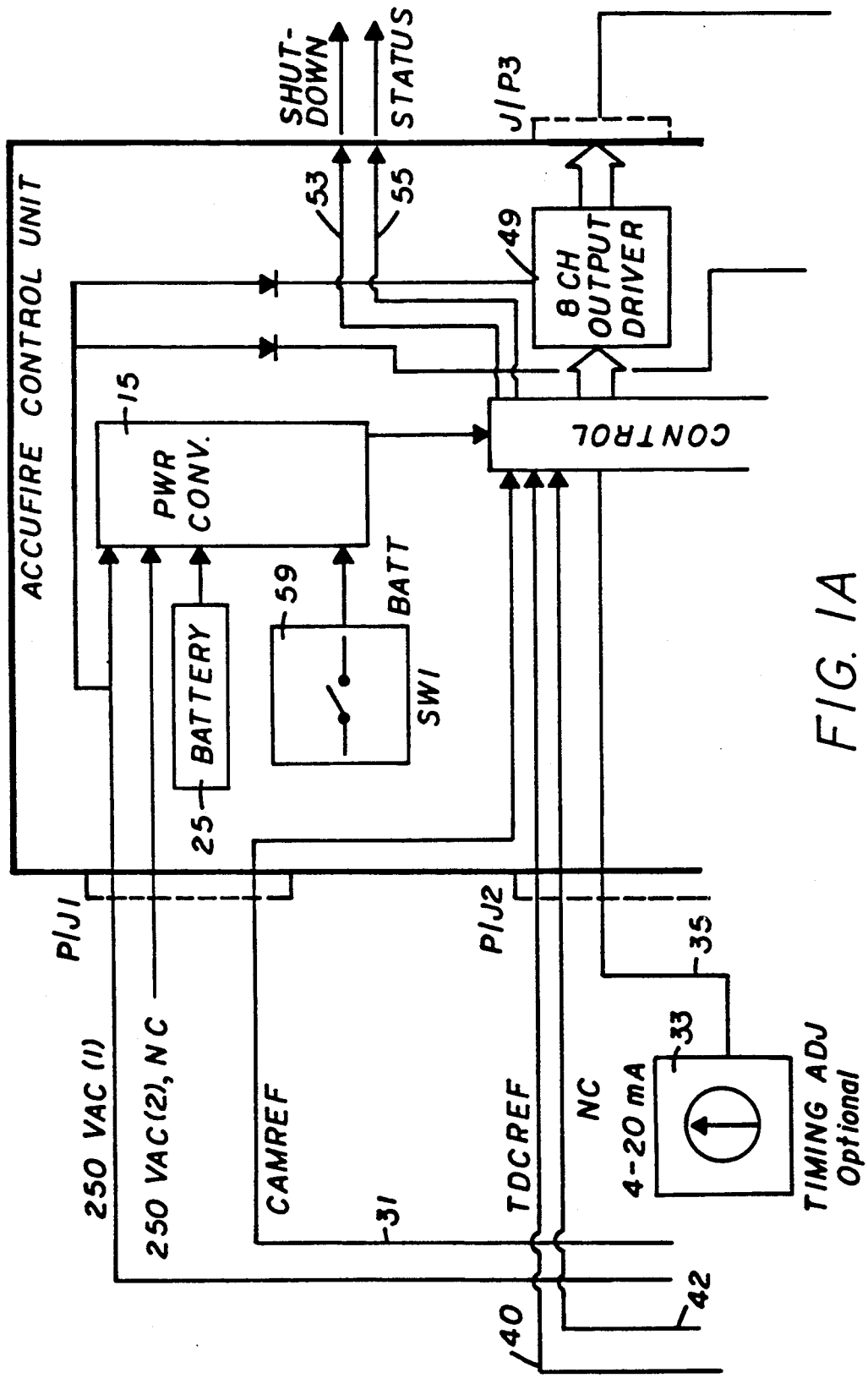
FIGS. 1A–1C are a schematic block diagram of an engine and ignition control system according to the present invention in one form.
Figure 1B:
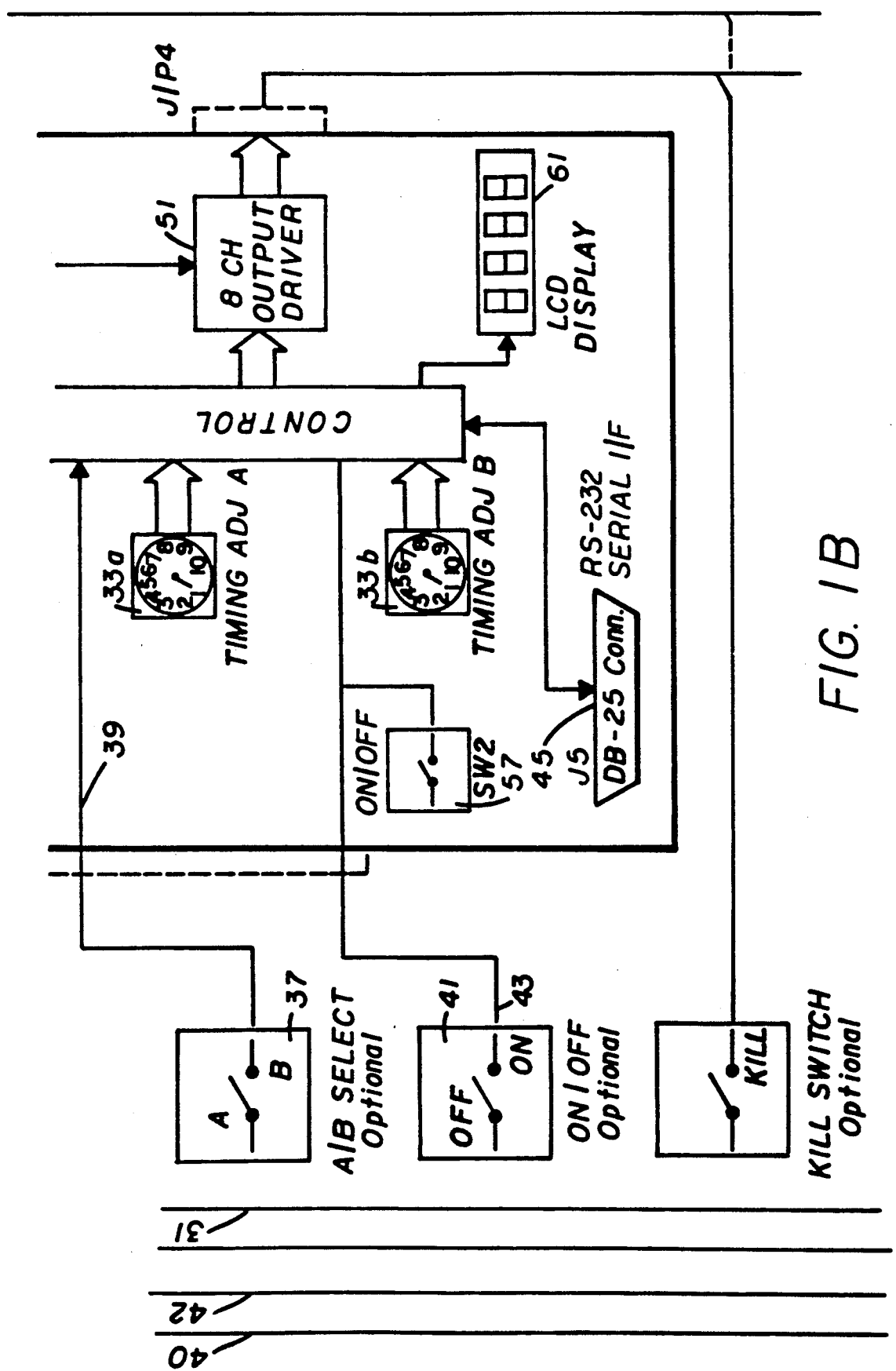
Figure 1C:
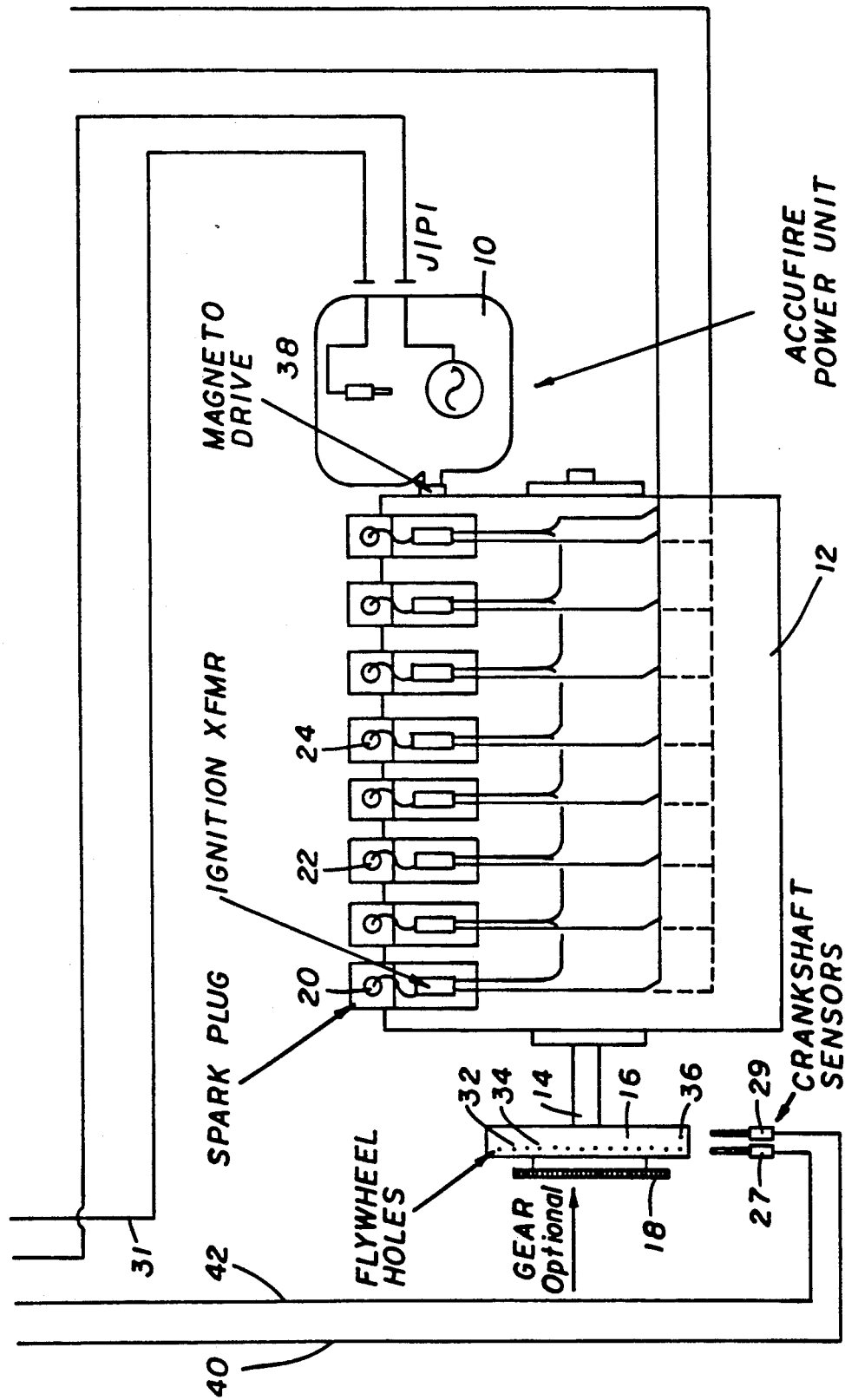
Figure 2A:
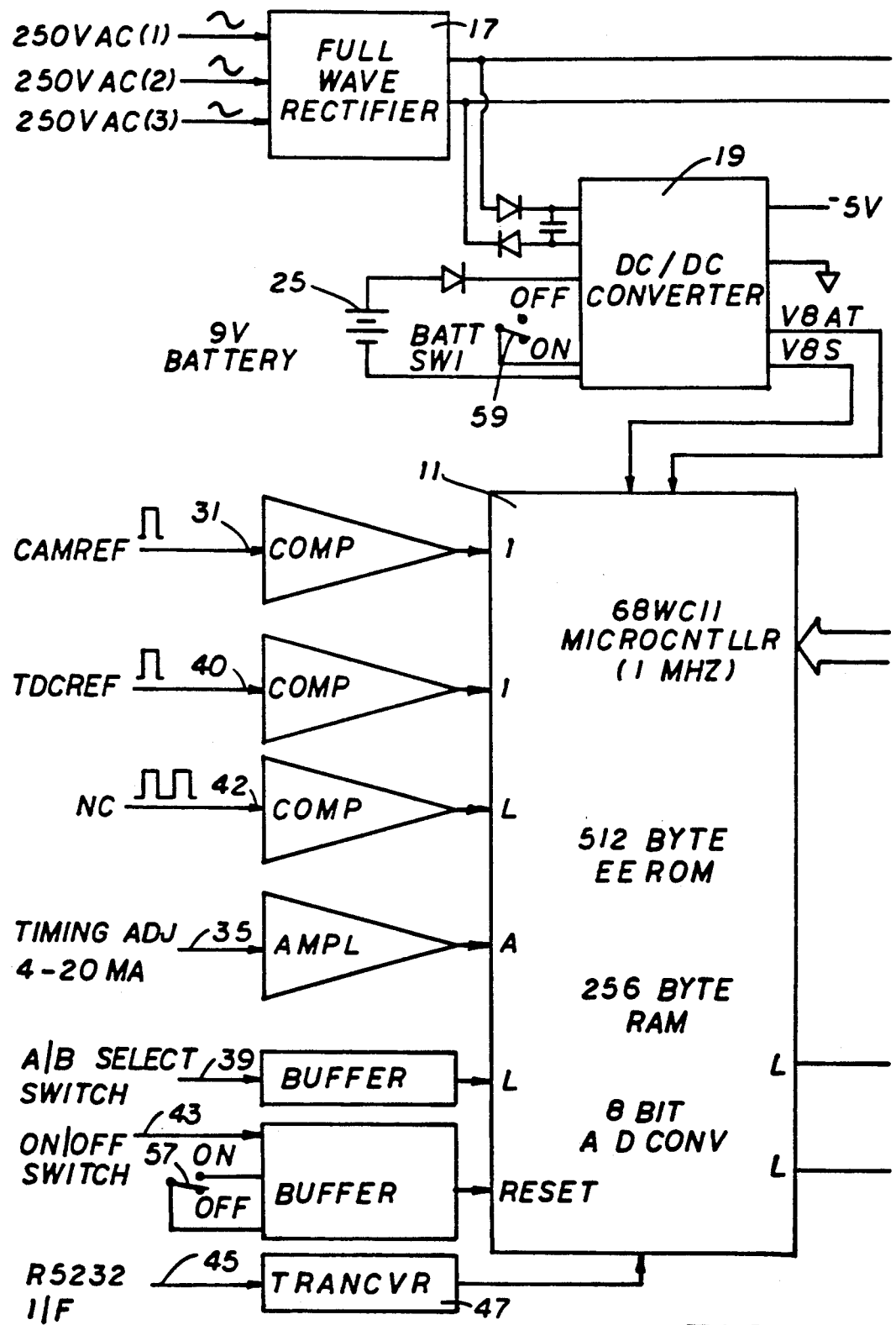
FIGS. 2A–2C are a more detailed schematic block diagram of the ignition control portion of the system of FIG. 1.
Figure 2B:
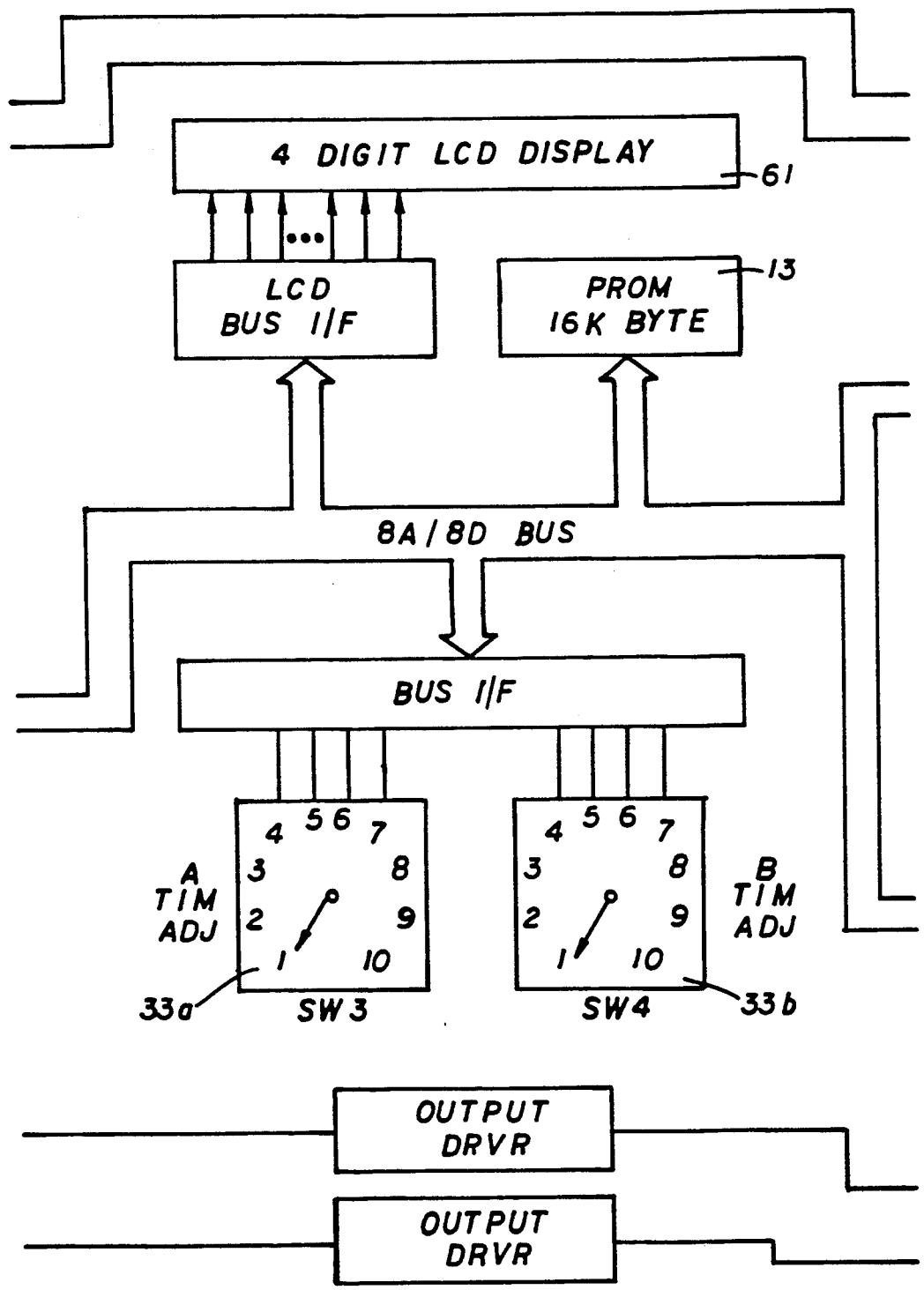
Figure 2C:
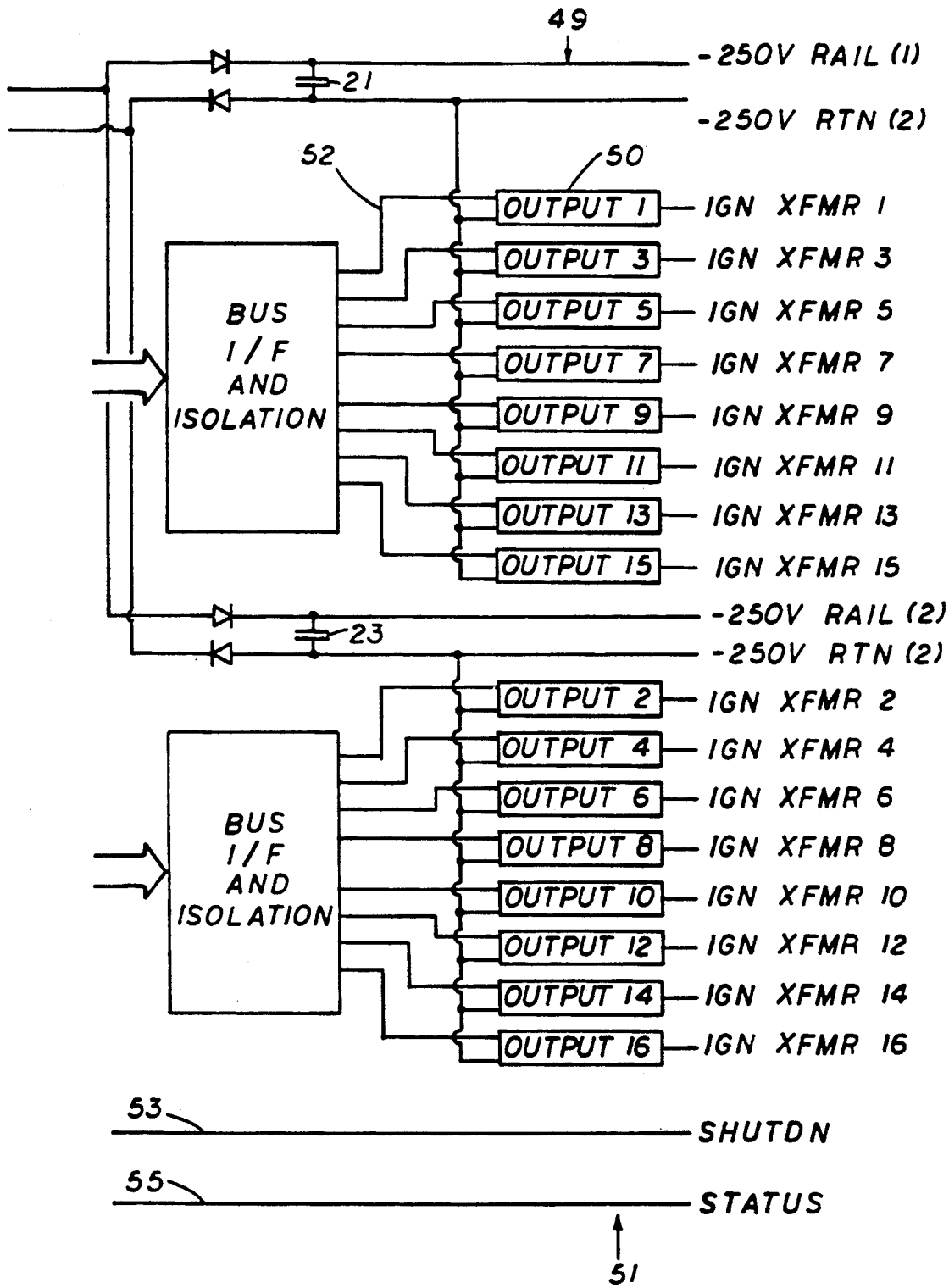

In FIG. 1, the engine 12 has a crankshaft 14 supporting a flywheel 16 and, optionally, a toothed gear wheel 18. The flywheel 16 may have a uniformly spaced set of holes or studs such as 32 and 34 which pass adjacent a first sensor 27 as well as a single hole or stud 36, the passage of which is detected by sensor 29, to provide a reference pint such as the beginning of each revolution, e.g., top dead center for a specific piston. This reference pulse from sensor 29 may be used as a counter reset pulse. The pulse from sensor 29 does not directly reset a counter. The pulse generates an interrupt to the microprocessor which, in turn, responds by presetting the NC counter with a calculated value determined by the particular application the NC counter increments the value that the TDCREF interrupt process preset into it every time an NC pulse is detected. This counting continues until the count overflows which overflow will occur at a consistent angular position on the flywheel for every qualified TDCREF pulse occurrence thus maintaining synchronism between the NC counter and the flywheel. The TDCREF pulse on line 40 should occur every revolution for two-stroke-cycle engines and for four-stroke-cycle engines, the TDCREF is qualified by the CAMREF pulse on line 31. In the four-stroke-cycle case, every other TDCREF pulse is used, namely the ones which are coincident with the CAMREF pulses. The CAMREF input on line 31 may occur more or less frequently than with every other TDCREF pulse so long as coincidence between the two occurs when a reference cylinder is at the top of the compression stroke.

Each time the NC counter overflows, the microprocessor uses the internal timer for precise measurement to the firing point and when reached, it will turn on the appropriate ignition driver causing a spark at the proper plug. The NC counter is preset after each overflow with a value that corresponds to the next closest point on the flywheel in NC increments prior to the next firing point. Once reached, the microprocessor will use the internal timer to measure in time (as opposed to crankshaft motion) from the overflow pint to the actual firing point of the plug.

The TDCREF pulse on line 40, in theory, need only occur one time after which the normal process of reloading the NC counter is automatic every time the counter overflows and should stay in synchronism with the flywheel if the NC input pulse train maintains perfect integrity from revolution to revolution. The TDCREF pulse provides a means of re-synchronizing the NC counter to the flywheel on every occurrence in the two-stroke-cycle case or on every occurrence that is coincident with the CAMREF pulse in the case of four-stroke-cycle operation. The TDCREF pulse also provides a check of the integrity of the NC pulse train. The total NC count since the previous TDCREF Pulse may be evaluated and, if out of tolerance, a fault indication initiated.

Magnetic or optical sensors detecting the passage of holes such as 32, 34 and 36, or the passage of teeth on a gear 16 as well as reed switches or a host of other techniques may be utilized to provide pulse trains indicative of engine speed and crank shaft angular position. An illustrative pulse train generated by sensor 29 is shown in FIG. 3b and appears on line 40 while one from sensor 27 appears on line 42 and is shown in FIG. 3c, and one from sensor 38 appears on line 31 is shown as FIG. 3a. The engine 12 is typically a large multi-cylinder engine having at least one spark plug such as 20 for each cylinder. Each spark plug such as 20, 22 or 24 may have associated therewith its own individual step-up transformer such as 26, 28 or 30 which receive timed capacitor discharge pulses on their respective inputs to fire the spark plugs.

The microprocessor based ignition control utilizes primarily CMOS type components centered around a Motorola 68HC11 microcontroller 11. While merely illustrative of a processor suitable for implementing the invention in one form, this microcontroller has an internal clock, a microprocessor, a self contained eight bit analog to digital (A/D) converter, 256 bytes of random access memory (RAM), 512 bytes of electronically erasable programmable read-only memory (EEPROM). An additional 16 Kilobyte erasable programmable read-only memory (EPROM) or other programmable read-only memory (PROM) 13 is also included for fixed subroutines. The internal clock may provide a 4 megahertz pulse train as shown (not to scale) in FIG. 3d. The repetition rate of this clock signal greatly exceeds that of the others depicted in FIG. 3 and, if drawn to actual scale, would appear to paint the entire region. Power for the system is provided by a 250 volt pulsed magneto 10 the output of which is converted by a power converter 15 which includes a full wave rectifier 17 and a DC to DC converter 19 which provides a five volt source of the electronic circuits. Magneto 10 may be a Bendix S1800 Series magneto available from applicants' assignee. The output of the full wave rectifier 17 is used to charge capacitors 21 and 23 which form a part of a capacitor discharge ignition. A nine volt battery 25 to provide power when the engine is not operating or during low RPM operation when the output of the magneto 10 is inadequate to supply all the electrical needs to the ignition system. Engine speed is measured by a sensor 27 which provides a pulse train of, for example, 60 pulses for each revolution. This pulse train is depicted in FIG. 3c. A second sensor 29 provides a reference pulse once each revolution as depicted in FIG. 3b, and the two pulse trains together provide an indication of current crankshaft position. For a two-stroke-cycle engine, an ignition pulse is provided to each cylinder once for each crankshaft revolution while a four-stroke-cycle engine cylinder requires an ignition pulse only once every other revolution. A cam reference input signal is provided on line 31 so that the controller can distinguish between the power and exhaust strokes during four-stroke-cycle operation. The cam reference signal is a pulse train as shown in FIG. 3a having a repetition rate which is half that of the signal on line 40 from crankshaft sensor 29. Such cam references are usually achieved by placing a sensor in close proximity to the engine cam shaft, however, in the present invention, the power unit 10 is coupled to the engine crankshaft with a two-to-one gear reduction and a sensor 38 detects each rotation thereof providing the desired pulse train.

In FIG. 3a, a pulse occurs once for every other revolution of the crankshaft while in FIG. 3b, a pulse occurs once for each crankshaft revolution. In FIG. 3c there would actually be, for example, sixty pulses between T0 and T3 corresponding to the number of holes or studs around the flywheel 16. At T0, a count of the pulses in FIG. 3c is initiated. When this count reaches a calculated value (two as illustrated) at time T1, a count of the clock pulses in FIG. 3d is initiated. When this count reaches a second calculated value at T2, a specific spark plug is energized. For four-stroke-cycle operation, there is not count of the FIG. 3c pulses initiated at T3 because of the lack of a pulse in FIG. 3a. In actual practice, the count does continue, but is simply no reset or initiated unless there is a CAMREF signal. The illustrated cycle runs from T0 on the left to a second T0 at the right when it begins to repeat. Modification of the desired count between T1 and T2 provides a very accurate change in timing.

An analog input which selectively retards timing is provided from the control 33 on line 35. The control may be indicative of speed changes or other parameters which would indicate timing retardation as being desirable. This feature allows the power cylinder peak pressure to be maintained close to optimum. As designed, the retard range is user programmable with the analog signal varying in the range of 4 to 20 milliamps. A pair of ten position rotary switches 33a and 33b are also provided to allow independent operator adjustment of two different ignition timing modes in program determinable steps. The availability of two different timing modes may be desirable, for example, when transfers ware made between fuels, or when step load changes are introduced. These two timing schedules (called A and B) can be programmed independently. Each can be programmed to be constant with speed, or to follow any selected timing vs. speed curve. For example, timing can be retarded during start for turbocharge operation. Then the start-run crossover speed timing could be programmed to switch to a fixed advanced position or could follow a more complex curve. Schedules A and B can be offset (the timing either advanced or retarded) from their programmed values by the switches 33a and 33b. Schedules A and B can also be retarded by an external analog signal on line 35 with the range of retardation being user programmable. Any change introduced by this signal is in addition to those caused by the program or by the switches 33a and 33b. The operator may select between the two different ignition timing modes by properly positioning the switch 37 which provides a controller input on line 39 and may shut down the processor by actuating switch 41 providing a signal on line 43. A further pair of switches 57 and 59 are provided to allow an operator to enable the processor under power of the battery 25 if some sort of engine status is required while the engine in quiescent or to allow programming of the processor via the RS232 port 45. The external logic inputs on lines 39 and 43 are logic discrete type inputs and are periodically poled by the processor 11.

When the ignition system is not in operation, a conventional lap-top or similar computer may be connected to the RS232 serial interface (I/F) 45 and internal transceiver 47 which allows the operator to communicate with the ignition processor i much the same way a conventional lap-top or similar compute may be connected in a network or by MODEM to bulletin boards, commercial databases and the like.

The output from the ignition system is by way of a total of sixteen possible isolated ignition drivers, eight from each of the eight channel output drivers 49 and 51. Capacitors 21 and 23 are alternately discharged through one of the step-up transformers such as 26 when an individual spark plug driver such as 50 receives an enabling signal on an input line such as 52. The system is designed to have a maximum spark duration of 1000 microseconds during start-up and to transfer to a shorter program determined spark duration at a program determined speed. Two additional discrete logic outputs are provided on lines 53 and 55. These outputs are programmable to provide indications of various engine status or fault conditions. For example, when an overspeed threshold is exceeded, ignition may be interrupted shutting down the engine and a indication provided by way of a signal on line 55. Alternatively, fuel supply may be interrupted by a signal on line 53 while ignition remains on so as to burn residual fuel prior to shut-down. A four digit liquid crystal display 61 for displaying input parameter and system programming data during programming of the processor as well as normal status or cyclic error codes during engine operation. For example, the display may repeatedly cycle through indications of the commanded firing angle, the engine RPM, which of the two selectable programs (A or B) is in effect, and a measure of the current into the analog (four to twenty milliamp) input 35.

The technique by which a fuel ignitting spark is provided at a very precisely determinable time in the engine cycle is most easily understood by considering the FIG. 3 waveforms. FIG. 3b shows an engine rotation determined pulse train having a repetition rate the same as the number of revolutions per second of the engine. This pulse train is generated by sensor 29 and provide a pulse which is indicative of engine crankshaft position. The repetition rate of this pulse train is speed dependent at one pulse per revolution. A second engine rotation determined pulse train is shown in FIG. 3c which has a repetition rate which is an integral multiple of that of the first pulse train. This pulse train is series of pulses indicative of engine speed. With sixty holes such as 32 or 34 around the flywheel, the repetition rate of the FIG. 3c pulse train is numerically the same as the engine RPM. The internal clock in the processor 11 provides a third pulse train depicted in FIG. 3d (not to scale) the repetition rate of which is significantly higher than that of the second pulse train and is independent of engine speed. The reference pulse may be utilized to initiate a count of pulses in the second pulse train and, upon reaching a preselected count, a count of pulses in the third pulse train is initiated. When the prescribed third pulse train count is attained, the spark plug is energized.

Because of the very high repetition rate of the third pulse train (e.g., 4mhz.) the precise time (count) after occurrence of the last of the pulses in the second pulse train can be extremely accurately controlled. Typically, the engine is a multi-cylinder engine having at least one spark plug for each cylinder and the pulses in the second pulse train are counted to different preselected counts of different cylinders, thereby enabling a different spark plug for each different preselected count. At least two different desired values for the third pulse train preselected count may be stored with each indicative of a desired time for energization of the spark plug, and either stored value may be manually modified to optionally manually fine-tune the time at which the spark plug is enabled.

From the foregoing, it is now apparent that a novel arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

We claim:

1. The method of enabling at least one spark plug of an internal combustion engine to provide a fuel igniting spark at a selectable time in the engine cycle comprising:

providing a first engine rotation determined pulse train the repetition rate of which is the same as the number of revolutions per second of the engine, whereby a pulse is provided which is indicative of engine crankshaft position;

providing a second engine rotation determined pulse train the repetition rate of which is an integral multiple of that of the first pulse train, whereby a series of pulses is provided indicative of engine speed;

providing a third pulse train the repetition rate of which is significantly higher than that of the second pulse train, the repetion rate of the third pulse train being independent of engine rotation;

utilizing the reference pulse to initiate a count of pulses in the second pulse train and, upon reaching a preselected count, initiating a count of pulses in the third pulse train; and enabling the spark plug when the third pulse train count reaches a preselected count.

2. The method of claim 1 wherein the engine is a multi-cylinder engine having at least one spark plug for each cylinder, the step of utilizing counting the pulses in the second pulse train to different preselected counts for different cylinders, the enabling step enabling a different spark plug for each different preselected count.

3. The method of claim 1 including the additional step of storing at least two different desired values for the third pulse train preselected count, each indicative of a desired time for enabling the spark plug, the step of enabling including the step of selecting a desired one of the two stored values.

4. The method of claim 1 including the additional step of manually modifying the preselected count of third pulse train pulses to thereby optionally manually fine-tune the time at which the spark plug is enabled.

5. The method of claim 1 wherein the step of enabling includes sensing the repetition rate of the second pulse train and determining the preselected count at which the spark plug is to be enabled in accordance with the sensed rate thereby varying ignition as a function of engine speed.

6. The method of claim 1 further comprising the step of preselecting an overspeed threshold repetition rate beyond which it is undesirable to operate the engine, continuously monitoring one of the first and second pulse trains, and initiating corrective action when the repetition rate of the monitored pulse train exceeds the overspeed threshold repetition rate.

7. The method of claim 1 wherein the step of enabling the spark plug when the third pulse train count reaches a preselected count includes the step of extending the time during which the spark plug is enabled when starting the engine so as to provide a spark of longer duration during start-up and spark of shorter duration during normal running.

8. An internal combustion engine microprocessor based ignition system which allows a more precise setting of the ignition timing to more precisely control the point in the engine cycle at which ignition occurs comprising:
- a first engine crankshaft rotation sensor for providing a first pulse train the repetition rate of which is the same as the number of revolutions per second of the engine, whereby a pulse is provided which is indicative of engine crankshaft position;
- a second engine crankshaft rotation sensor for providing a second pulse train the repetition rate of which is an integral multiple of the first pulse train, whereby a series of pulses is provided indicative of engine speed;
- means for providing a third pulse train the repetition rate of which is significantly higher than that of the second pulse train, the repetition rate of the third pulse train being independent of engine rotation;
- digital circuitry responsive to the reference pulse to initiate a count of pulses in the second pulse train and, upon reaching a preselected count, to initiate a count of pulses in the third pulse train; and
- means for storing a desired value of the third pulse train count indicative of the desired time of ignition in the engine cycle; and
- means causing ignition when the third pulse train count reaches the stored desired value 9. The internal combustion engine microprocessor based ignition system of claim 8 further comprising means for storing a second desired value of the third pulse train count indicative of a second desired time of ignition in the engine cycle, and means for optionally replacing the desired value with the second desired value to determine the time of ignition in the engine cycle.

10. The internal combustion engine microprocessor based ignition system of claim 8 wherein the engine is a multi-cylinder engine having at least one spark plug for each cylinder, the digital circuitry reaching a different preselected count of pulses in the second pulse train for each different cylinder, the means causing ignition enabling a different spark plug for each different preselected count.

11. The internal combustion engine microprocessor based ignition system of claim 8 further comprising an optional manual control for modifying the desired value of the third pulse train count to fine-tune the ignition timing if necessary.

12. The internal combustion engine microprocessor based ignition system of claim 8 further comprising means for storing a first selected running spark duration indicative value, means for storing a second value indicative of a selected engine speed at which it is desired to change spark duration, and comparison means for comparing engine speed as indicated by one of the first and second pulse trains with the second stored value and providing an indication when the compared values are equal, the means for causing ignition providing a maximum duration spark at engine start-up and responding an indication from the comparison means to reduce the spark duration to that indicated by the first stored value.

13. The internal combustion engine microprocessor based ignition system of claim 8 further comprising an analog signal source for providing a signal the magnitude of which is indicative of a desired amount of spark retardation, analog to digital converter for converting the analog signal to an appropriately scaled digital signal, and means for adding the appropriately scaled digital signal to the stored desired value of the third pulse train count and supplying the sum to the means causing ignition when the third pulse train count reaches the stored desired value thereby delaying time of ignition in the engine cycle.

14. The internal combustion engine microprocessor based ignition system of claim 13 further comprising means for storing a second desired value of the third pulse train count indicative of a second desired time of ignition in the engine cycle, and means for optionally replacing the desired value with the second desired value to determine the time of ignition in the engine cycle.

15. The internal combustion engine microprocessor based ignition system of claim 14 further comprising display means for cyclically repeatedly displaying each of a plurality of different engine operating parameters including the commanded angle at which ignition occurs, the current engine RPM, which of the desired or second desired values currently controls engine ignition, and a measure of the spark retardation indicative analog signal.

* * * * *